United States Patent Office 3,795,751
Patented Mar. 5, 1974

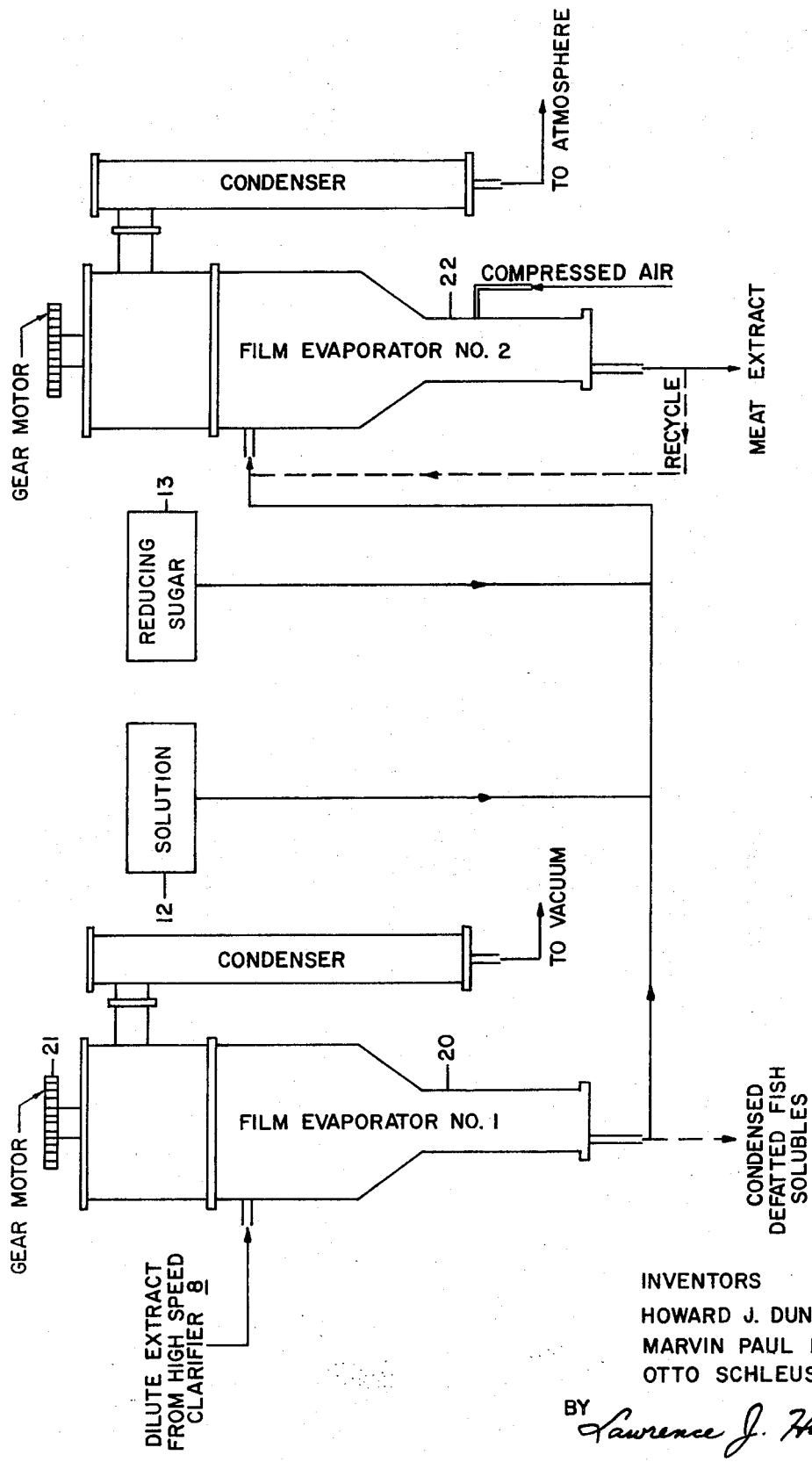

3,795,751
FOOD PRODUCT AND METHOD OF
MAKING SAME
Howard J. Dunn, Lomita, Marvin Paul Farr, San Pedro, and Otto Schleusner, Wilmington, Calif., assignors to Ralston Purina Company, St. Louis, Mo.
Continuation-in-part of application Ser. No. 767,705, Oct. 15, 1968. This application Sept. 14, 1970, Ser. No. 72,081
Int. Cl. A23l 1/28
U.S. Cl. 426—221                                15 Claims

ABSTRACT OF THE DISCLOSURE

Cooker juice produced by the cooking of fish and, or presswater produced by the pressing of cooked whole fish or cooked fish offal are treated so that a substantially unhydrolyzed defatted fish solubles product is obtained such that the fat content is approximately 1% on a dry weight basis. This product may be used as a flavoring material. In addition, the pH of the defatted fish solubles may be controlled to within the range of 6.0 to 9.0, and the material heated and agitated at a predetermined temperature for a period of time. During the heating and agitation, the volatile amines and additional moisture are being removed from the product. At the same time, a browning reaction occurs, the fishy flavor and odor disappears, and a meat-like flavor forms in the product. If desired, a reducing sugar, such as glucose, is added to the fish solubles prior to heating to enhance the meat-like flavor.

BACKGROUND OF THE INVENTION

This application is a continuation-in-part of application Ser. No. 767,705 filed Oct. 15, 1968 entitled imitation Meat Extract now abandoned.

This invention relates generally to food products such as flavoring materials and more particularly to a novel and useful simulated meat extract product. These products may be made from the cooker juice and/or fishmeal rendering presswater of tuna-like fish, such fish include albacore, bluefin, bonito, skipjack, yellowfin, yellowtail, mackerel, anchovies and herring.

The use of condensed fish solubles, commonly referred to as fish solubles, as an animal feed material is well known. However, the prior art fish solubles utilized contained a high level of fat. This is undesirable since the fish fat contains undesirable fish flavor and odor characteristics and it is highly advantageous to recover as much of the fat as possible for sale as a separate item. Applicant has discovered a method of removing a high level of fat from the fish solubles product without adversely effecting the flavor thereof. This low fat fish solubles product may be condensed and utilized in obtaining a fish-like flavor in food products. In addition, the defatted fish solubles may be subjected to additional treatment to produce an imitation meat extract for human foods.

The use of a meat extract, such as a beef extract, as an ingredient in gravies, bouillons, soups and other foods is well known. The normal method utilized in producing such a beef extract is to cook beef muscle in boiling water to obtain a rich flavored beef broth. The beef broth is then further boiled to precipitate hot-water insoluble protein and then processed to remove most of the fat. A clear broth which contains approximately 2% meat solids and has the essence of beef flavor is then obtained. The broth is then concentrated under carefully controlled conditions to develop the finished extract. The cost of producing such a beef extract is very high since it is necessary to use the muscle tissue of beef in its production.

According to the present invention, it is possible to produce a simulated beef extract from tuna-like fish by-products which is much cheaper to manufacture than the heretofore known beef extracts and which affects the flavor characteristics of food products in substantially the same manner as a beef extract.

Also, it is well known in the art to product flavoring, such as chocolate, from edible fish solubles by treating solubles which have been hydrolyzed, such as by subjecting the solubles to enzymatic or acid hydrolysis. However, such a treatment converts both the insoluble protein as well as the soluble protein to amino acids which is not desirable in producing a product having a beef-like flavor as disclosed by the subject invention.

As will be apparent in the ensuing description of this invention, the water soluble proteins and other soluble constituents of the fish liquor are not hydrolyzed by strong acid conditions while the other undesirable and unwanted constituents such as lipids, insoluble proteins and volatile amines are eliminated from being a part of the final product. Instead, these soluble proteins and other soluble constituents are subjected to controlled conditions to produce a product having a meat-like flavor. Thus, by reacting whole protein or solubilizing intact protein without first hydrolyzing, it is possible to utilize the water soluble fish protein from tuna-like fish cannery byproducts to obtain a product having a meat-like flavor or a beef-like flavor substantially similar to a beef extract.

In addition, it is possible to combine the unhydrolyzed defatted tuna-like fish solubles with a reducing sugar controlled conditions to produce a product having an enhanced meat-like or beef-like flavor.

SUMMARY OF THE INVENTION

Therefore, it is the general object of the present invention to provide products for use as flavoring materials and a method of producing same.

Another object of the present invention is to provide a product which utilizes tuna-like fish cooker juice and/or fishmeal rendering presswater, normally considered cannery or fish by-products to produce flavoring materials.

Another object of the present invention is to provide a simulated meat extract and principally a beef extract product suitable for human food which has as its principal component defatted fish solubles.

It is an important object of this invention to completely extract the fat or lipid material from fish presswater and cooker juice without employing any type of solvent chemical for fats such as ethers, alcohols ketones, or chlorinated solvents which are in common usage for extracting fat from proteinaceous materials. The use of such solvents have the main disadvantage of contributing undesirable flavor to the product in addition to other uneconomic aspects of processing.

A more specific object of the present invention is to provide a method of processing tuna-like fish by-products to obtain substantially unhydrolyzed defatted fish solubles which may be utilized as a flavoring material. In addition, the fish solubles may be subjected to controlled conditions to produce a simulated meat or beef extract which does not have the fish-like flavor and odor normally attendant with processed fish. Further, a reducing sugar may be added to the fish solubles such that a product having an enhanced meat or beef-like flavor is developed.

Briefly, the present invention comprises a method for producing a flavoring material from tuna-like fish by-products by forming an acidulated liquor from the fish by-products having a pH of 4.0–4.8, briefly, heating the acidulated liquor, removing the protein sediment therefrom and thereafter centrifuging the liquor to obtain the substantially unhydrolyzed defatted fish solubles. The defatted fish solubles may be utilized as a flavoring material to impart a desired fish-like flavor to a food material such as cat foods. In addition, the defatted tuna-like fish solubles which have a fat content of no more than approximately 1% on a dry weight basis may be further treated to obtain a simulated beef extract product. The pH of the defatted fish solubles is controlled within the range of approximately 6.0–9.0, heated and agitated at a temperature of 140° F. to 205° F. for a minimum of 4 hours whereby the volatile amines are eliminated and a browning action occurs to form a meat-like or beef-like flavored product. If desired, a reducing sugar may be added to the fish solubles prior to heating in order to obtain an enhanced meat-like or beef-like flavor.

These and other objects and advantages of the present invention will become apparent hereinafter.

DESCRIPTION OF THE DRAWINGS

In the drawings which illustrate an embodiment of the present invention.

FIG. 2 is another flow diagram illustrating another embodiment of the process of the present invention.

DESCRIPTION OF THE PREFERRED EMBODIMENTS

Figure 1:
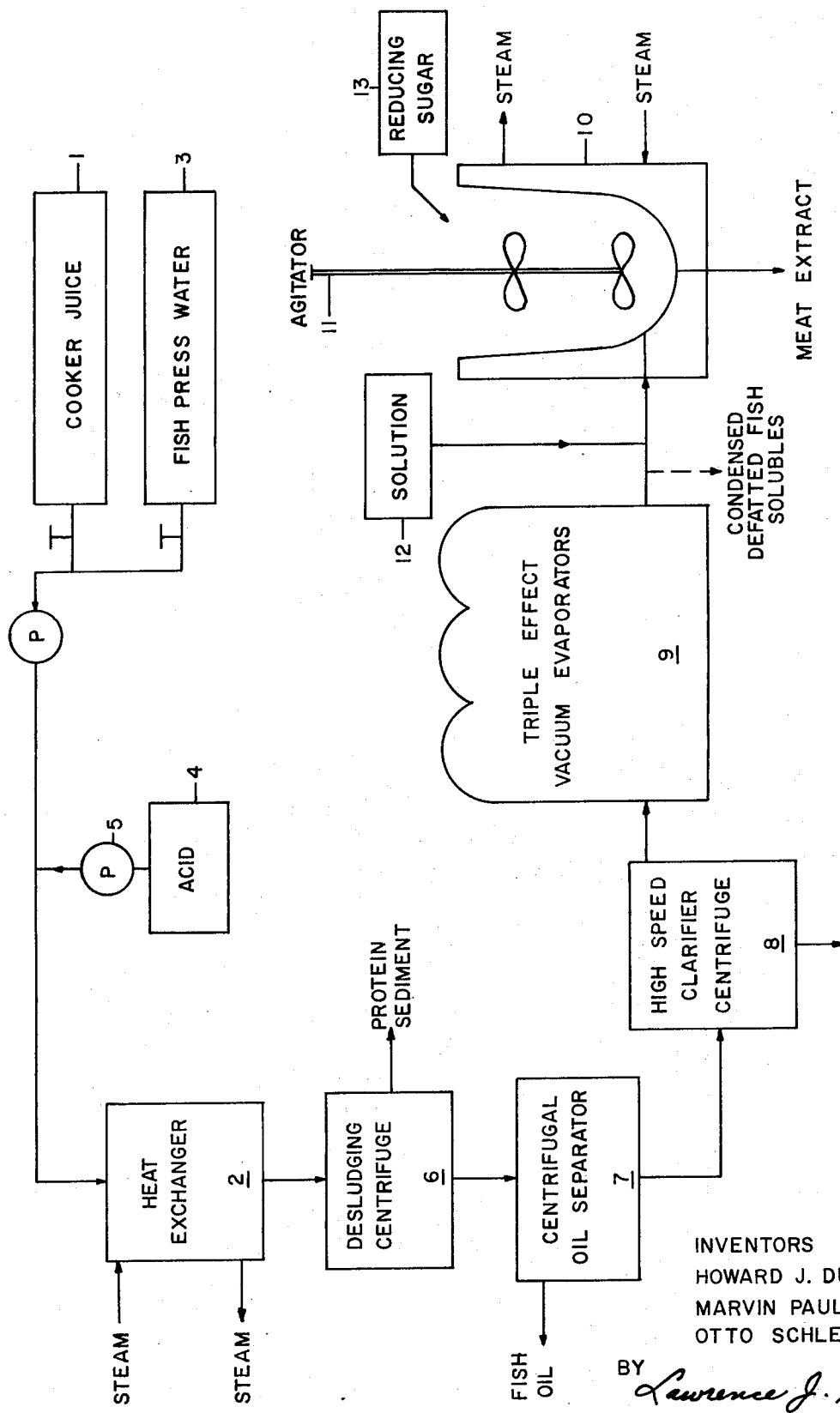
FIG. 1 is a flow diagram illustrating the process of the present invention.

Cooker juice which is obtained as a byproduct during the precooking operation in the processing of canned tuna-like fish is pumped from vat 1 through a heat exchanger 2. Also, it is possible to use tuna-like fish rendering presswater from vat 3 in place of cooker juice or in combination therewith and said presswater is readily obtainable as is well known in the fish processing art. The cooker juice and fish presswater are normally considered byproducts in a cannery operation. Acid 4 is fed by means of metering pump 5 to the fish liquor flow in a predetermined proportion to form an acidulated liquor and adjust the pH of the tuna-like fish cooker juice and/or fish presswater within the range of approximately 4.0 to 4.8 and preferably the pH should be approximately 4.3. The acids to be used may be either hydrochloric, sulfuric, or phosphoric and preferably sulfuric acid will be used. The acidulated liquor is continuously heated by indirect steam in heat exchanger 2 which is maintained at a temperature of about 180° to about 210° F. and preferably approximately 200° F. The acidulated liquor is heated for a brief period of time usually about 2–5 minutes to allow the acid to coagulate the insoluble protein, but without hydrolyzing the protein. The acidulated, heated liquor is then passed through a commercially available desludging centrifuge 6 such as available from the DeLaval Company which removes a gross amount of unwanted insoluble protein sediment. The centrifuged liquid is then passed through a commercially available two phase contrifugal separator 7 such as available from the DeLaval Company whereupon the free fish oil is removed as a byproduct. The fish liquid is then finally clarified in a commercially available high gravity centrifuge 8 such as is available from the Sharples Company which removes the last traces of lipo-protein sediment and leaves an essentially unhydrolyzed fat-free liquid having the typical composition as follows:

| | Percent |
|---|---|
| Total solids | 5 |
| Protein | 4 |
| Total lipid less than | 0.05 |
| Water | 95 |

The defatted tuna-like fish solubles may then be utilized as a flavoring material by adding to a food product. However, it is probably preferable that the unhydrolyzed fish liquor be concentrated, such as by evaporation in the triple effect vacuum evaporator 9, which is commercially available from suppliers such as Blaw-Knox Company and Majonnier Company, prior to being used as a flavoring material. Normally, the material exiting from the evaporator 9 will have a final solids content of approximately 50%. The fish solubles will serve to produce a desired fish-like flavor in a product and is particularly useful as a flavoring material in cat food, although it may be utilized in other foods as well. In addition, if desired, the defatted condensed fish solubles may be further condensed by evaporation to obtain a more concentrated product for use as a flavoring material or it may be completely concentrated to a dry powder by spray drying.

If it is desirable to produce an imitation meat extract from the defatted tuna-like fish liquor, it may be further treated as follows. Preferably, the clear, aqueous unhydrolyzed, fat free, fish extract from the centrifuge 8 is then drawn into a triple effect vacuum evaporator 9, as was previously described. The liquid entering the evaporator 9, will have a total solids concentration of approximately 4 to 15% and as the liquid exits from the evaporator 9, it should have a final solids content of approximately 50%. This product is designated as defatted condensed fish solubles and will have a typical composition as follows:

| | Percent |
|---|---|
| Total solids | 50 |
| Protein | 40 |
| Fat less than | 0.5 |
| Other materials (such as sodium, potassium and chloride) | 7.6 |
| pH, 4–4.8 | |

It is desirable to utilize the condensed fish solubles since it reduces the heating time required later on in the process. If desired, the fish solubles would not have to be in a condensed form and the unhydrolyzed liquor as obtained from the centrifuge 8 could be utilized. However, the tuna-like fish solubles utilized should be such that they have a fat content of no more than approximately 1% on a dry weight basis since starting materials having a fat content higher than this level results in the final products having a fish flavor.

The defatted condensed tuna-like fish solubles product is then pumped from the evaporator 9 into a steam jacketed kettle 10 which is commercially available from suppliers such as Grooen Manufacturing Company and Oscar Krenz Company. The kettle 10 is equipped with an agitator or stirring paddles 11 for effecting a stirring action in the substantially unhydrolyzed condensed fish solubles material contained therein. A solution 12 is then added to the condensed fish solubles material to adjust the pH to a value within the range of 6 to 9 and preferably to approximately 7. The solution 12 to be added for adjusting the pH is preferably a sodium hydroxide solution although other solutions such as potassium hydroxide or calcium hydroxide may be used.

The material is then heated and agitated or stirred at a temperature of 140° F. to 205° F. and preferably is heated in the range of 195° F. to 200° F. for a sufficient period of time to drive off undesirable odors and develop the desired flavor. The heating should be conducted in the presence of air since, although it is not known precisely what reaction occurs during heating, it has been found that the desirable meat flavor is not developed when the material is heated under a vacuum. Additional heating may be utilized to effect a reduction in the moisture content of the material. It has been found that heating in the above range should be carried out for a minimum period of 4 hours to develop the desired meat-like flavor and solids content. During this heating time the volatile amines such as trimethyl amines and additional moisture are being removed from the product. In addition, during the heating and agitation operation the fish flavor and odor disappears or is stripped from the fish solubles material and a meat-like or beef-like flavor forms in the product. When the total solids content of the mixture reaches 70% to 80%, the entire batch is discharged and packaged for final use as simulated meat extract. However, it should be realized that other solids contents may be utilized if desired and this will vary the amount of heating time utilized.

If desired, a solution of glucose or reducing sugar 13 may be added to the fish solubles material in the kettle 10 prior to the heating and agitation operation. The reducing sugar added should not exceed 10% by weight of the fish solubles (dry weight) and preferably should be approximately 2.5% by weight. Any suitable food grade reducing sugar may be used, such as glucose, galactose, mannose, lactose, maltose, inverted sucrose and ribose, however, glucose has been found to be the most preferable reducing sugar to be used. The addition of the reducing sugar serves to enhance the meat-like or beef-like flavor developed in the fish solubles material during the heating and agitation operation.

Referring now to FIG. 2, a modified embodiment of the process which may be utilized for making the meat extract is shown. The process for preparing the substantially unhydrolyzed tuna-like fish solubles would be identical through the high speed centrifuge 8 and thereafter the acidulated liquor from the high speed centrifuge 8 is pumped through a Votator Turba-Film Evaporator 20 which is commercially available from suppliers such as the Votator Division of Chemetron Corporation. Basically, the Film Evaporator 20 consists of a chamber which is heated by means of steam jackets thereon. The chamber is connected to a vacuum source so that moisture may be removed from the acidulated liquor. The acidulated liquor is maintained as a film on the side of the chamber by rotor blades coaxially mounted in the chamber and driven by gear motor 21. The blades are maintained with a predetermined clearance at the wall of the chamber to provide a scrubbing action of the liquid film and to provide control of the temperature within the chamber. The material as it exits from the Film Evaporator 20 may then be utilized in the form of condensed fish solubles as was previously discussed or may be further treated to produce the imitation meat extract. The tuna-like fish solubles may be condensed in the evaporator 20 to 50% to 60% total solids, the preferable solids content when the product is to be used as a flavoring material, or may be condensed to a concentration of about 20% solids for further processing in the system. The condensed defatted tuna-like fish solubles are adjusted to the pH range of 6-9 and preferably to 7 by means of metering the solution 12 into the condensed fish solubles. This is the same solution also described with respect to the process described in FIG. 1. In addition, if desired, a reducing sugar 13 such as has been previously described can also be added to the defatted fish solubles prior to the material entering the Turba-Film Evaporator 22 which serves to enhance the meat-like flavor developed. The Turba-Film Evaporator 22 is of identical construction to the evaporator 20. The evaporator 22 is connected to atmosphere rather than to a vacuum since as previously discussed, in order to develop the desired meat-like flavor, the heating of the material should not be done under a vacuum. In addition, compressed air may be introduced into the lower portion of the evaporator 22 in order to accelerate the development of the meaty flavor within the fish solubles being processed therein. The temperature of the film of condensed fish solubles materials which are passed through the evaporator 22 is controlled within the range of 140-205° F. and maintained therein for a sufficient period of time to achieve the stripping of the fish odor therefrom permitting the development of a meat-like or beef-like flavor. As an alternative, it may be desirable to recycle the material through the evaporator 22 as it is discharged therefrom or to cycle the material through other film evaporators to insure that the proper stripping of the fish odor and flavor has been accomplished and the meat-like flavor has been developed.

As previously discussed, it is possible to utilize the fish solubles prior to the condensing operation. In addition, it is also possible to add water to a fish solubles concentrate to thereby dilute the mixture so that a longer heating time will be required which allows more of the volatile amines to be driven off or volatilized. The amount of water so added will depend on the length of heating time desired, however, a water addition of up to 100% by weight of the condensed fish solubles has been found to work satisfactorily.

To assure that one having ordinary skill in the art will understand this invention, the following detailed examples are provided, however, these examples are furnished merely for informational purposes and are not intended to limit the scope of the invention herein.

EXAMPLE 1

Five hundred grams of substantially unhydrolyzed condensed defatted solubles (containing 50% by weight total solids and 0.5% fat) prepared from tuna cooker juice was diluted with 500 grams of water. The resulting diluted fish solubles materials were adjusted to a pH of approximately 7.0 with 50% sodium hydroxide. Five percent glucose based on the dry solids content of the fish solubles was then added (12.5 grams glucose/250 g. dry solids). The resulting mixture was evaporated in an open porcelain dish placed on a boiling water bath. The mixture was agitated periodically throughout the eight-hour period required to bring the solids to 81.3% by weight total solids. The resulting product has a beef-like flavor and no trace of fish taste or odor.

EXAMPLE 2

Five hundred grams of 50% solids substantially unhydrolyzed condensed defatted fish solubles having approximately 1% fat on the dry weight basis and derived from cooker juice from the yellowfin species was adjusted to a pH of approximately 7.2 with 50% sodium hydroxide. Ten percent glucose was added to the neutralized mixture containing approximately 50% by weight total solids (25 g. glucose per 250 g. dry solids). The resulting mixture was heated with periodic agitation in a porcelain dish heated on a boiling water bath. The maximum temperature attained by the mixture was 193° F. and the time required to reach 70% total solids was 4 hours. The resulting mixture had a definite beef-like flavor and a very rich dark brown color.

EXAMPLE 3

Fifteen gallons (approximately 150 lbs.) of substantially unhydrolyzed defatted condensed cooker juice containing 50% by weight total solids and 0.5% fat was placed in a 25 gallon steam jacketed stainless steel kettle. The cooker juice was diluted to a volume of 20 gallons and the pH was adjusted to 7.5. The resulting mixture was heated and agitated for 6.5 hours at a temperature of 190-200° F. No sugar was present other than the naturally occurring glucose and ribose approximately 1% dry basis. The resulting mixture had meat-like flavor but was somewhat chicken-like in odor and medium dark brown in color.

EXAMPLE 4

One hundred pounds of a mixture consisting of 50% tuna cooker juice and 50% anchovy fish presswater was acidulated to a pH of 4.2 by adding 0.18 pound of sulfuric acid. The mixture had the following approximate composition:

| | Percent |
|---|---|
| Water | 89 |
| Fat | 4 |
| Protein | 6 |
| Ash | 1 |

This mixture was heated to a temperature of 200° F. in a heat exchanger 2 for a period of 5 minutes and then passed through a desludging centrifuge 6 to result in about 5 pounds of moist protein sediment which was discarded and 95 pounds of desludged liquid which was retained. This liquid was passed through a centrifugal oil separator 7 to result in 3 pounds of clear fish oil and 92 pounds of deoiled liquid. This deoiled liquid was then passed through a high-speed Sharples clarifying centrifuge 8 to result in about 2 pounds of moist lipo-protein sediment which was discarded and 90 pounds of crystal-clear liquid having the approximate composition:

|  | Percent |
|---|---|
| Water | 95 |
| Fat | 0.03 |
| Protein | 4.0 |
| Ash | 0.95 |

The above clear liquid was then condensed in a stainless-steel vacuum evaporator 9 until 81 pounds of water was removed by evaporation to result in 9 pounds of condensed fish solubles having the composition:

| Water | percent | 50 |
|---|---|---|
| Protein | do | 40 |
| Fat less than | do | 0.3 |
| Ash | do | 9.5 |
| pH |  | 4.2 |

EXAMPLE 5

To 9 pounds of the condensed solubles prepared according to Example 4, about 3 pounds of water was added and the pH adjusted to 7.5 with 10% sodium hydroxide. The resulting mixture was placed in a large dish and slowly heated on a steam bath with stirring for 8 hours at a temperature range of 190° F. to 200° F. It was observed that about midway through this heating period the strong fishy odor vanished and was replaced by the appearance of a meaty, beef-like odor. This meaty odor gradually reaches its full intensity near the end of the 8 hour period of heating. The color also changed from a light yellow brown to a dark chocolate brown during this period. The final yield amounted to 6.2 pounds of meat extract having a solids content of 72.5%.

EXAMPLE 6

Meat extract made in accordance with Example 2 was used to make a spray dried beef consumme by utilizing the following formula:

|  | Percent by wt. |
|---|---|
| Meat extract (from tuna-like fish) | 70 |
| Monosodium glutamate | 2 |
| Sugar | 7 |
| Salt | 20.68 |
| Misc. amount of flavor enhancers. | |

Twenty-five pounds of the above formula was dissolved in six gallons of distilled water and then spray dried under usual drying conditions. The product was a free-flowing powder of small round spheres. The product was very hygroscopic and when the powder was dissolved in water, the aroma was released and reconstituted beef consumme was produced.

From the foregoing, it is now apparent that a novel defatted fish solubles product and method of producing same for use as a flavoring material has been described. In addition, a meat extract product and method of producing same, from defatted fish solubles, which substantially has a beef-like flavor has been disclosed. It is now apparent that the products and processes for producing same meeting the objects set out hereinbefore is provided and that changes or modifications as to the products and methods of producing same set forth in the disclosure by way of illustration may be made by those skilled in the art without departing from the spirit of the invention, as defined by the claims which follow.

We claim:

1. A method of producing a simulated meat extract product from tuna-like fish byproducts liquor selected from the group of cooker juice, presswater and combinations thereof comprising the steps of treating the fish by-products liquor with an acid to adjust the pH of the liquor to the range of approximately 4.0 to 4.8, heating the acidulated liquor for a brief period of time to coagulate the insoluble protein without hydrolyzing the protein, separating substantially all of the insoluble protein and fat from the liquor to obtain a defatted fish solubles liquor having a fat content of no more than approximately 1% on a dry weight basis, adjusting the pH of the defatted fish solubles liquor within the range of 6.0 to 9.0, heating the defatted fish solubles liquor in the presence of air to a temperature within the range of 140° F.–205° F., and agitating the defatted fish solubles liquor as it is heated for a sufficient period of time for the fish odor to be stripped from the fish solubles liquor and for a meat-like flavor to be formed.

2. The method according to claim 1 wherein the heating and agitating steps are carried out for a sufficient period of time for the simulated meat extract to attain a total solids content of 70% to 80%.

3. The method according to claim 1 including the step of adding a reducing sugar to the defatted fish solubles liquor prior to the heating step.

4. The method according to claim 3 wherein the reducing sugar is glucose.

5. The method according to claim 3 wherein the amount of reducing sugar does not exceed 10% by weight of the dry weight of the defatted fish solubles.

6. The method according to claim 5 wherein the reducing sugar content is approximately 2.5% by weight of the dry weight of the defatted fish solubles.

7. The method according to claim 1 wherein the heating and agitating steps are carried out for at least four hours.

8. The method according to claim 1 wherein the pH of the defatted fish solubles liquor is adjusted to approximately 7.0 by the addition of sodium hydroxide to the liquor.

9. The method according to claim 1 wherein the pH of the fish soluble liquor is controlled within the range of 6.0 to 9.0 by the addition of a solution selected from the group consisting of sodium hydroxide, potassium hydroxide and calcium hydroxide.

10. A method for producing a simulated beef extract product from neutral defatted fish soluble liquor material having a fat content of no more than approximately 1% on a dry weight basis comprising forming an acidulated liquor from tuna-like fish by-products liquor having a pH within the range of 4.0–4.8, heating the acidulated liquor at a temperature of about 180 to about 200° F. for about 2–5 minutes to allow the acid to coagulate the insoluble proteins but without hydrolyzing the protein, removing the protein sediment from the acidulated liquor, and centrifuging the acidulated liquor to remove the lipo-protein portion and retain the defatted fish solubles liquor material having a fat content of no more than approximately 1% on a dry weight basis, adjusting the pH of the defatted fish soluble liquor material to substantially neutral, heating the neutral defatted fish solubles liquor material in the presence of air to a temperature within the range of 140° F.–205° F. and subjecting the material to agitation as it is heated for a sufficient period of time to strip the fish odor therefrom and permit the formation of a beef-like flavor in the material.

11. The method according to claim 10 including the step of adding a reducing sugar to the defatted fish soluble liquor material prior to the heating step, the reducing sugar not exceeding 10% by weight of the dry weight of the defatted fish soluble(s) liquor material.

12. A method for producing a simulated beef extract comprising forming an acidulated liquor from tuna-like fish by-products selected from the group of cooker juice, fish presswater and combinations thereof having a pH within the range of 4.0 to 4.8, heating the acidulated liquor to a temperature of about 180° F.–210° F. for about 2–5 minutes, removing the protein sediment from the acidulated liquor, centrifuging the acidulated liquor to obtain the defatted fish solubles material having a fat content of no more than approximately 1% on a dry weight basis, adjusting the pH of the defatted fish solubles material within the range of 6.0 to 9.0, heating the defatted fish solubles material in the presence of air to a temperature within the range of 180° F.–205° F. and agitating the material as it is heated for a sufficient period of time for the fish odor to be stripped from the fish solubles material and for a beef-like flavor to be formed.

13. The method according to claim 12 including the step of adding a reducing sugar to the substantially unhydrolyzed defatted fish solubles prior to the heating step, the reducing sugar not exceeding 10% by weight of the defatted fish solubles.

14. The method according to claim 12 including the step of condensing the substantially unhydrolyzed defatted fish solubles material to a solids content of approximately 50% prior to the pH adjustment.

15. The simulated beef extract product produced by the process of claim 5.

References Cited
UNITED STATES PATENTS

| | | | |
|---|---|---|---|
| 2,372,677 | 4/1945 | Lassen | 99—7 |
| 2,934,433 | 4/1960 | Brocklesby et al. | 99—7 |
| 2,188,008 | 1/1940 | Lassen | 167—81 |
| 3,480,447 | 11/1969 | Hack et al. | 99—140 |

RAYMOND N. JONES, Primary Examiner

U.S. Cl. X.R.

426—229, 380, 442

UNITED STATES PATENT OFFICE
CERTIFICATE OF CORRECTION

Patent No. 3,795,751     Dated March 5, 1974

Inventor(s) Howard J. Dunn, Marvin Paul Farr and Otto Schleusner

It is certified that error appears in the above-identified patent and that said Letters Patent are hereby corrected as shown below:

Column 1, line 37 - "imitation" should be substituted by "Imitation".

Column 2, line 7 - "product" should be substituted by "produce".
Column 2, line 30 - "under" should be inserted after "sugar".
Column 3, line 54 - "contrifugal" should be substituted by "centrifugal".
Column 7, lines 9 - 12, the decimal point in the percentages of the table should be vertically aligned as follows:

|         | Percent |
|---------|---------|
| Water   | 95      |
| Fat     | 0.03    |
| Protein | 4.0     |
| Ash     | 0.95    |

Column 7, lines 18 - 22, the decimal point in the percentages of the table should be vertically aligned as follows:

|               | Percent |
|---------------|---------|
| Water         | 50      |
| Protein       | 40      |
| Fat less than | 0.3     |
| Ash           | 9.5     |
| pH            | 4.2     |

UNITED STATES PATENT OFFICE
CERTIFICATE OF CORRECTION

Patent No. 3,795,751      Dated March 5, 1974

Inventor(s) Howard J. Dunn, Marvin Paul Farr and Otto Schleusner

It is certified that error appears in the above-identified patent and that said Letters Patent are hereby corrected as shown below:

-- Page 2 --

Column 7, lines 45 - 49, the decimal point in the percentages of the table should be vertically aligned as follows:

|  | Percent |
|---|---|
| Meat extract (from tuna-like fish) | 70 |
| Monosodium glutamate | 2 |
| Sugar | 7 |
| Salt | 20.68 |

Column 8, line 68 - "soluble(s)" should be substituted by "solubles".

Signed and sealed this 29th day of October 1974.

(SEAL)
Attest:

McCOY M. GIBSON JR.
Attesting Officer

C. MARSHALL DANN
Commissioner of Patents